Patented Mar. 29, 1949

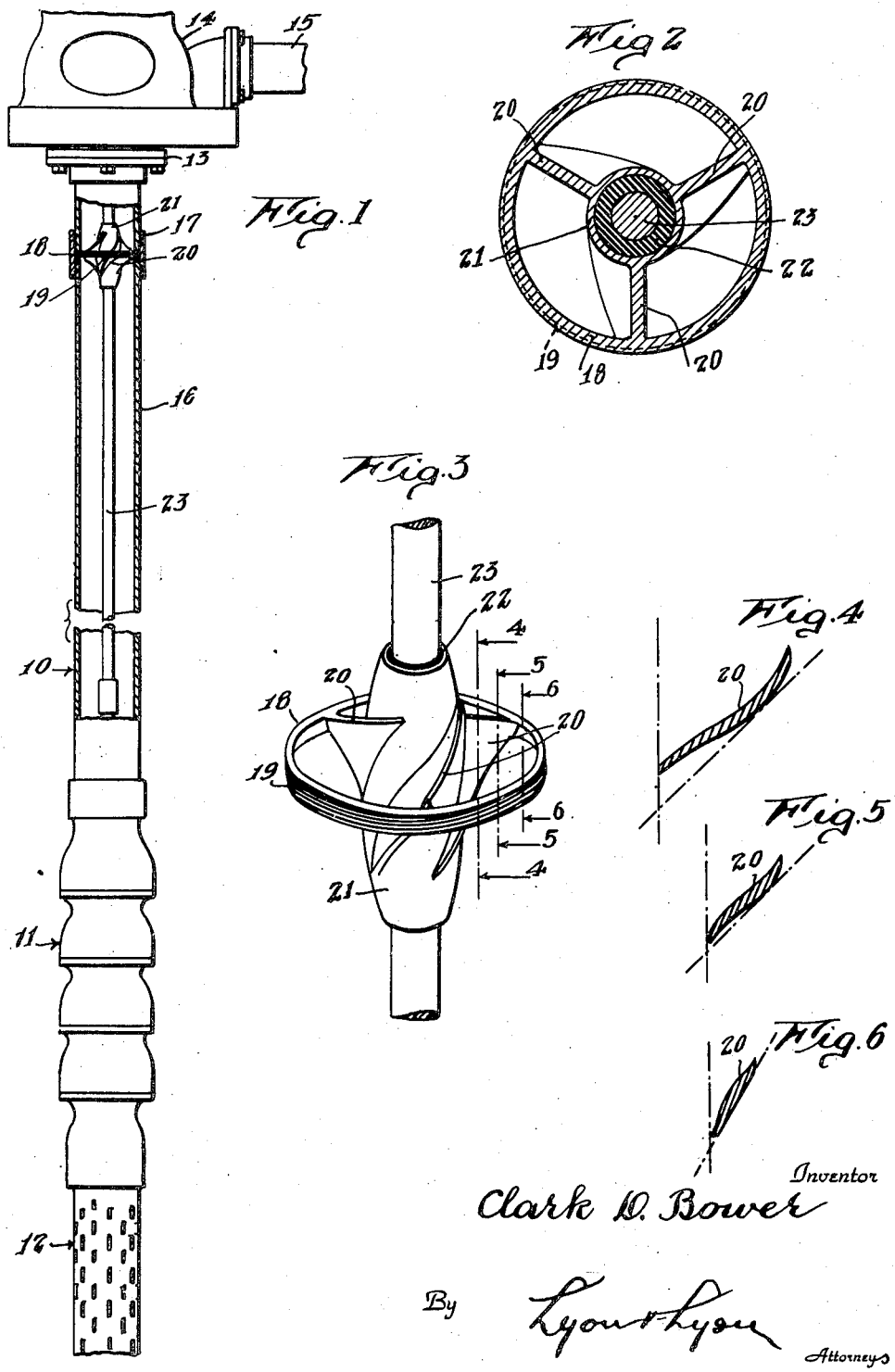

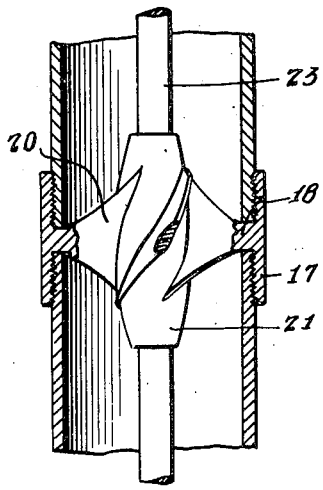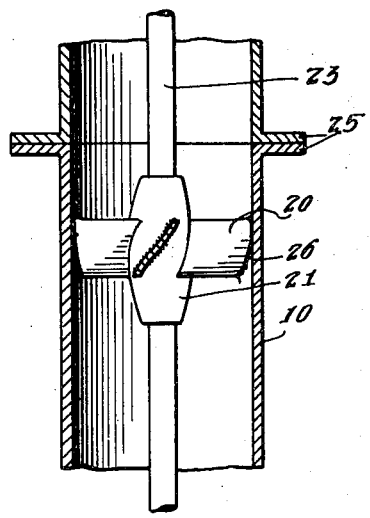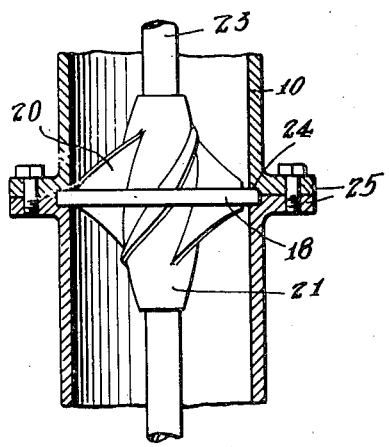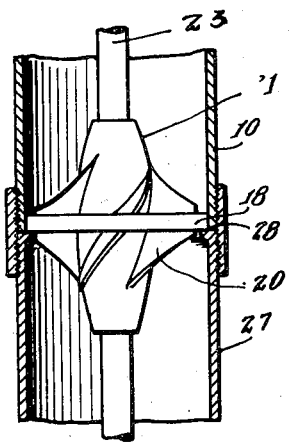

2,465,425

UNITED STATES PATENT OFFICE 2,465,425

INTERMEDIATE BEARING RETAINER FOR DEEP WELL PUMPS

Clark D. Bower, Pomona, Calif., assignor, by mesne assignments, to Fairbanks, Morse & Co., a corporation of Illinois Application July 24, 1944, Serial No. 546,392

4 Claims. (Cl. 103—111)

This invention relates to bearing retainers and more particularly to the type of bearing retainer provided in deep well water pumps and spaced intermediately in the column pipe to support the shaft of said deep well pump. While adaptable for use for the conventional type of bearing this invention is especially adapted for the supporting of a vertical guide bearing of the water lubricated resilient type wherein a resilient bearing member is free to rotate within a retainer housing as fully set forth in the patent to Oliver No. 1,557,767.

I have discovered by observations and tests that in deep well pumps, and particularly of the type using rotating impellers located near the bottom of the well casing and having a column pipe and a center shaft extending through said column pipe supported at intervals by intermediate bearings, that the water being pumped from the wells is caused to swirl around the rotary shaft in a rising corkscrew motion. This motion is greatest nearest the shaft and decreases radially toward the column pipe walls.

This swirling action represents energy imparted to the water column and also assists in overcoming the lift drag at the column pipe walls. Any obstruction placed in the path of this swirling water column slows the swirling action and tends to produce eddies in the column. Additional energy is wasted in again setting the water in the column into rotation in the event of any such interruption.

It is accordingly one object of this invention to provide an intermediate bearing support of the type indicated having a plurality of radially extending webs for supporting the bearing member, said webs being tilted or wound in the form of a helix about the bearing in the direction of the rotation of the shaft.

It is another object of this invention to provide a bearing support of the type indicated in which the web members supporting said bearing are so positioned in the column pipe as to lie approximately parallel to the normal swirling motion of the water column in said well.

It is a further object of this invention to provide a bearing of the type indicated in which resistance or interruption to the swirling motion of the water about the shaft is reduced to a minimum.

Further objects and advantages appear hereinafter.

Fig. 1 is a diagrammatic view, partly in section, showing a well equipped with a bearing retainer in accordance with my invention.

Fig. 2 is a horizontal section of the bearing retainer.

Fig. 3 is a perspective elevation of the shaft and bearing retainer.

Fig. 4 is a section taken on the line 4—4 of Figure 3.

Fig. 5 is a section taken on the line 5—5 of Figure 3.

Fig. 6 is a section taken on the line 6—6 of Figure 3.

Fig. 7 is a vertical section showing another embodiment of my invention wherein the ring member is an integral part of the coupling.

Fig. 8 is a vertical section of another embodiment of my invention in which the retainer is employed with a column of flanged piping and the ring member is seated in a recess formed by said flanged piping.

Fig. 9 is a vertical section of another embodiment of my invention employing four of the webs disposed about the retainer and having their outer ends welded to the column.

Fig. 10 is a vertical section of another embodiment of my invention in which the ring member, being seated upon a shoulder formed on the inside of said column pipe, provides a floating type retainer which can be lifted out of the column.

Referring more particularly to the drawings, I have shown a pump having a column 10, a pump 11 preferably of the type employing rotating impellers, and a strainer 12. At the top of the well there is provided a flange 13, a pump head 14 and an outlet 15. As is usual in such cases, the column 10 is formed of a plurality of pipe sections 16 joined together by couplings or pipe joints 17. The intermediate bearing retainer of this invention includes an outer ring member 18 which is usually threaded on the outer surface thereof as at 19 for engagement by the coupling 17 as shown in Fig. 1. A plurality of helically wound webs 20, shown herein as three in number, extend from the ring 18 to the bearing 21, thereby supporting said bearing 21. As shown particularly in Figs. 2 and 3, shaft 23 is surrounded by a sleeve 22 which may be designed in accordance with the aforesaid Oliver Patent No. 1,557,767 to provide a water or fluid lubricated bearing. In this event the sleeve 22 will be formed of a resilient substance such as vulcanized rubber and in use will rotate with the shaft in the event sand causes the proper bearing to become temporarily "frozen" and then allow the bearing to gradually free itself of the sand obstruction and will bear on the bore of the retainer 21.

In practice I have found it advantageous to form the ring 18 in the shape of a rather thin annulus while the bearing 21 is relatively elongated. The webs 20 at their inner ends engage the bearing member 21 along approximately the full length of said bearing and at their outer ends taper to engage the thin ring 18. Thus forming the webs 20 causes the webs to be wider at their inner ends and narrower at their outer ends as is clearly shown in Figs. 4, 5 and 6.

Referring particularly to Fig. 3 and assuming a counterclockwise rotation of the shaft, the water being impelled by the rotating impeller will swirl about the shaft in a rising spiral, the velocity and angle of which will vary in accordance with the speed of the shaft and the diameter of the pipe and in practicing my invention I attempt to so wind the helical webs 20 that they will conform to the direction of the flow of the water and interpose a minimum of obstruction thereto. In use of a bearing support in accordance with this invention, inasmuch as the path of the swirling water will vary as heretofore stated, it is impractical to provide a bearing support having the webs designed to conform exactly to the motion of the water in all cases but I have found that a bearing support having a spiral form substantially as shown in Fig. 3 of the drawings affords a substantially increased efficiency by reducing the flow friction losses.

In the alternative embodiment of my invention shown in Fig. 7, the bearing retainer is formed substantially as in the type above described with the exception that the ring 18 is formed as an integral part of the coupling 17.

In the alternative embodiment of my invention shown in Fig. 8, the bearing retainer is formed with the ring 18 seated in a recess 24 formed by the flanged elements 25 of the column pipe 10.

In the alternative embodiment of my invention shown in Fig. 9 there is shown a bearing retainer having four radially extending webs 20 having their outer ends welded as at 26 to the column 10. In this form of the invention it has been found practical to form said webs 20 of a uniform width rather than tapering down at their outer ends as in the other embodiments of my invention herein illustrated.

In Fig. 10 I have shown an alternative embodiment of my invention in which the ring 18 is seated upon a shoulder 28 formed in the lower member 27 of the column 10. In this form of the invention as the bearing retainer is merely seated upon the shoulder 28 it is of the floating type and may readily be lifted directly from the column.

The radially extending webs 20 may be characterized as "nondirectional" webs or "nonenergy transferring" webs to distinguish over guide webs whose function is different from the function served by the webs 20 shown and claimed herein, the function of the webs 20 being to impart a minimum resistance to a swirling liquid flow without changing the direction of such liquid flow and without extracting substantially no energy from such liquid flow.

While the particular forms of the invention herein described are well adapted to carry out the objects of the invention, it is to be understood that various modifications and changes may be made without departing from the principles of the invention, and the invention includes all such modifications and changes as come within the scope of the appended claims.

I claim:

1. A deep well pump including a column, means for causing upward flow of a liquid in said column, said last named means including a shaft extending upwardly through the column, a bearing member for said shaft having a column contacting member, a plurality of radially extending streamlined nonenergy transferring and nondirectional webs between said column contacting member and said bearing member and supporting said bearing member with respect to said column, said column contacting member comprising a ring member, said bearing member being substantially longer than said column contacting member, said web members being wound about said bearing member in the direction of rotation of the swirling liquid flow and of the shaft to be supported and being of decreasing cross section in the radial outward direction to impart a minimum resistance to said swirling liquid flow, said radially extending webs being set at a substantial angle to the vertical and the said angle nearest the said bearing member being greater than the angle of said web nearest the said supporting ring member and forming a helix of greater rise at its periphery than at its center, the inner ends of said web members being substantially longer than the outer ends thereof, to thereby allow said liquid flow to continue to rotate when and as it engages and passes said web member.

2. A deep well pump including a column, means for causing upward flow of a liquid in said column, said last named means including a shaft extending upwardly through the column, an intermediate bearing retainer for the shaft having an outer ring member secured to the column and an inner bearing member supporting the pump shaft, and a plurality of radially extending nonenergy transferring and nondirectional webs between said ring member and said bearing member to support said bearing member, said radially extending webs being set at a substantial angle to the vertical and the said angle nearest the said bearing member being greater than said web nearest said supporting ring member and forming a helix of greater rise at its periphery than at its center and having their inner bearing contacting ends substantially wider than their outer ring contacting ends to impart a minimum resistance to swirling liquid flow to thereby allow a rotating column of water within said column to continue to rotate when and as it engages and passes said webs.

3. A deep well pump including a cylindrical column, means for causing upward swirling flow of a liquid in said column, said last named means including a rotating shaft extending upwardly through the column, a bearing retainer for the shaft having an outer ring member secured to the cylindrical column, an inner bearing member supporting the rotating shaft, and a plurality of radially extending streamlined nondirectional and nonenergy transferring webs between said ring member and said bearing member to support said bearing member, said radially extending webs being set at a substantial angle to the vertical, and the said angle nearest the said bearing member being greater than the angle of said web nearest the said supporting ring member and forming a helix of greater rise at its periphery than at its center, the inner bearing contacting ends of the webs being substantially wider than the outer ring contacting ends thereof, to thereby allow a rotating column of water within said column to continue to rotate when and as it engages and passes said webs.

4. A deep well pump including a column, means for causing upward flow of a liquid in said column, said last named means including a rotating shaft extending upwardly through the column, a bearing retainer for the shaft having an outer ring member having a threaded portion adapted for removable connection with the coupling of a cylindrical column, an inner bearing member adapted to support a rotating shaft, and a plurality of radially extending streamlined nonenergy transferring and nondirectional webs between said ring member and said bearing member to support said bearing member, said radially extending webs being set at a substantial angle to the vertical and the said angle nearest the said bearing member being greater than the angle of the said web nearest the said supporting ring member and forming a helix of greater rise at its periphery than at its center, and said webs having inner bearing contacting ends substantially wider than its outer ring contacting ends, to thereby allow a rotating column of water within said column to continue to thereby allow a rotating column of water within said column to continue to rotate when and as it engages and passes said webs.

CLARK D. BOWER.

REFERENCES CITED

The following references are of record in the file of this patent:

UNITED STATES PATENTS

| Number | Name | Date |
|--------|------|------|
| 433,990 | Martin | Aug. 12, 1890 |
| 733,229 | Loomis | July 7, 1903 |
| 1,271,836 | Bennett | July 9, 1918 |
| 1,404,698 | Schleyer | Jan. 24, 1922 |
| 1,443,516 | Zimansky | Jan. 30, 1923 |
| 1,481,552 | Haney | Jan. 22, 1924 |
| 1,557,767 | Oliver | Oct. 20, 1925 |
| 1,887,417 | Mawson | Nov. 8, 1932 |
| 1,932,881 | Bowen | Oct. 30, 1933 |

FOREIGN PATENTS

| Number | Country | Date |
|--------|---------|------|
| 819,814 | France | July 19, 1937 |